United States Patent
Kikuchi et al.

(10) Patent No.: US 6,469,823 B2
(45) Date of Patent: Oct. 22, 2002

(54) OPTICAL WAVELENGTH CONVERTER AND OPTICAL WAVELENGTH DIVISION MULTIPLEXING COMMUNICATION SYSTEM USING THE SAME

(75) Inventors: Hideyuki Kikuchi, Yokohama (JP); Sunao Itou, Yokohama (JP); Satoshi Fukutomi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 96 days.

(21) Appl. No.: 09/750,242

(22) Filed: Dec. 29, 2000

(65) Prior Publication Data

US 2001/0055148 A1 Dec. 27, 2001

(30) Foreign Application Priority Data

Jun. 15, 2000 (JP) ........................................ 2000-180495

(51) Int. Cl.$^7$ ................................................. G02F 1/01
(52) U.S. Cl. ....................................................... 359/326
(58) Field of Search ............................... 359/326–332; 372/20–22

(56) References Cited

U.S. PATENT DOCUMENTS 5,345,455 A * 9/1994 Gabriagues et al. .......... 372/20

FOREIGN PATENT DOCUMENTS

JP 10-004418 1/1998 ........... H04L/12/28

OTHER PUBLICATIONS

M. Fujiwara et al, "A Coherent Photonic Wavelength–Division Switching System For Broadband Networks", Fourteenth European Conference on Optical Communication (ECOC 88), Conference Publication No. 292, vol. 1, pp. 139–142, Brighton, UK, 1988.*

M. Fujiwara et al, "A Coherent Photonic Wavelength–Division Switching System For Broad–Band Networks", Journal of Lightwave Technology, vol. 8, No. 3, pp. 416–422, Mar. 1990.*

* cited by examiner

Primary Examiner—John D. Lee
(74) Attorney, Agent, or Firm—Staas & Halsey LLP

(57) ABSTRACT

Optical wavelength converter having a configuration whereby both RZ code and NRZ code can be handled without producing the duty deterioration in the waveform. The optical wavelength converter provided for converting an optical signal in a first optical wavelength band into an optical signal in a second optical wavelength band includes an optical-to-electrical converter for converting an input optical signal into an electric signal; an electrical-to-optical converter for converting the electric signal into an optical signal; and a duty control circuit connected between the optical-to-electrical converter and the electrical-to-optical converter for controlling the duty of the electric signal having been converted by the optical-to-electrical converter according to RZ/NRZ code information.

6 Claims, 13 Drawing Sheets

Duty is deteriorated

205: Adjusting E/O Input Bias Voltage

OPTICAL WAVELENGTH CONVERTER AND OPTICAL WAVELENGTH DIVISION MULTIPLEXING COMMUNICATION SYSTEM USING THE SAME

FIELD OF THE INVENTION

The present invention relates to a method and equipment for connecting optical communication systems using different wavelength bandwidths, for example connecting a system using 1.3 µm-band optical wavelength and a system using 1.5 µm-band optical wavelength, thereby to transmit signals therebetween corresponding to each signal type consisting of either RZ (return-to-zero) code or NRZ (non-return-to-zero) code.

BACKGROUND OF THE INVENTION

An optical wavelength converter is particularly beneficial to a wavelength division multiplexing (WDM) optical communication system, in which data are transmitted in a plurality of channels through a common optical fiber using multi-wavelength signal light.

As the amount of transmission data through a backbone optical communication system abruptly increases, the larger capacity is required in an optical communication system. As a method therefor, a wavelength division multiplexing (WDM) optical communication system has been started in use.

A WDM optical communication system is developed mainly using optical wavelengths in 1.5 µm band. On the other hand, conventional optical terminal station systems employ 1.3 µm band. Therefore, optical wavelength conversion is necessary for connecting these systems.

In FIG. 1, there is shown a schematic configuration diagram of a WDM optical communication system. In the existing optical terminal station system employing 1.3 µm band, optical signals having a plurality of optical wavelengths in 1.3 µm band are generated. A plurality of 1.3 µm band optical signals are respectively converted into optical signals having different wavelengths of 1.5 µm band in an optical wavelength converter 102.

Then, optical signals having different wavelengths of 1.5 µm band are wavelength-multiplexed in a multiplexing circuit 110 of a 1.5 µm WDM transmission system 103 to transmit through an optical fiber transmission line 111.

At the receiving side of 1.5 µm WDM transmission system 103, wavelength-multiplexed optical signals transmitted through optical fiber transmission line 111 are received to be divided into each optical signal having respective wavelength by a demultiplexing equipment 112.

The wavelength-divided optical signals of 1.5 µm band are converted into optical signals of 1.3 µm band by an optical wavelength converter 104 to transmit to 1.3 µm WDM transmission system 105.

Here, the transmitted optical signals are formed of either NRZ (non-return-to-zero) code or RZ (return-to-zero) code.

In FIG. 2, there are shown conventional configurations of optical wavelength converters 102 and 104 illustrated in FIG. 1. In particular, FIGS. 2A and 2B respectively show optical wavelength converters 102 and 104 in case the optical signal is formed of NRZ code. FIGS. 2C and 2D show optical wavelength converters 102 and 104 in case the optical signal is formed of RZ code.

In FIGS. 2A and 2B, there are shown optical wavelength converters 102 and 104 having identical configuration, provided with an optical-to-electrical converter 203 and an electrical-to-optical converter 204 coupled by a capacitor C. Electric outputs of a non-inverted signal (DATA) and an inverted signal (NDATA) having been converted into an electric signal by optical-to-electrical converter 203 are led to electrical-to-optical converter 204.

In electrical-to-optical converter 204, the signal is converted into a corresponding optical signal having wavelength of either 1.5 µm band or 1.3 µm band.

Also, in FIGS. 2C and 2D, the configurations of optical wavelength converters 102 and 104 are identical, each provided with an optical-to-electrical converter 203 and an electrical-to-optical converter 204 coupled by a capacitor C. Electric outputs of a non-inverted signal (DATA) and an inverted signal (NDATA) having been converted by optical-to-electrical converter 203 are led to electrical-to-optical converter 204.

Moreover, in the configurations shown in FIGS. 2C and 2D, a bias voltage is applied to the output of the capacitor C from a bias adjustment circuit 205.

The reason for requiring this bias adjustment circuit 205 in case of RZ code is explained later.

A configuration example of optical-to-electrical converter 203 used in the aforementioned optical wavelength converters 102 and 104 is shown in FIG. 3.

In FIG. 3, optical signals transmitted through an optical fiber 201 or 202 are received by a photo diode PD to convert into an electric signal of which magnitude correspond to the magnitude of an optical signal. The electric signal is amplified by a pre-amplifier 206, and is output to a signal having a limited amplitude adjusted by a waveform shaping circuit 207.

In FIG. 4, there are shown waveforms in various parts of optical-to-electrical converter 203 shown in FIG. 3 in the cases of RZ code and NRZ code. Waveforms in case of RZ code are shown on the left column, and waveforms in case of NRZ code are shown on the right column.

There are respectively shown outputs [a] and [b] from pre-amplifier 206 in FIG. 4A, inputs [a'] and [b'] to waveform shaping circuit 207 in FIG. 4B, and output waveform [a"] and [b"] from electrical-to-optical converter 203 in FIG. 4C.

Now the case of RZ code is described hereafter. As shown in FIG. 4A, a mean value of non-inverted output DATA ([a]) output from pre-amplifier 206 locates lower than the center of amplitude [O], and a mean value of inverted output NDATA ([b]) locates higher than the center of amplitude [O]. This is because the period of L level is longer than the period of H level in consequence of the nature of RZ code.

Accordingly, a waveform of signal obtained through a capacitor C to be input to waveform shaping circuit 207 is changed with the center of amplitude shifted for a bias voltage. In an example shown in FIG. 4B, the waveform is shifted for approximately one-fourth of the amplitude.

Input signals [a'] and [b'] are shaped by waveform shaping circuit 207 into waveforms each having a constant amplitude. However, because the phase is shifted, the duty remains deteriorated, as shown in FIG. 4C.

Now the case of NRZ code is described, referring to the diagrams shown on the right side of FIG. 4. In this case, because of the nature of NRZ code, the period of H level and the period of L level is substantially identical, producing no bias voltage. Therefore, the duty is not deteriorated in the output of waveform shaping circuit 207.

In FIG. 5, there is a diagram for illustrating the reason for providing a bias adjustment circuit 205. Bias adjustment circuit 205 is provided to solve the problem of duty deterioration produced in case of RZ code as shown in FIG. 4, caused by the bias voltage shifted in optical-to-electrical converter 203. Bias adjustment circuit 205 is provided in optical wavelength converter 104 as shown in FIGS. 2C and 2D.

In FIG. 5A, there are illustrated waveforms [a"] and [b"] output from optical-to-electrical converter 203 corresponding to FIG. 4C. As understood from the figure, mean values of non-inverted output signal DATA and inverted output signal NDATA are shifted from the center of amplitude caused by RZ code.

Therefore, in FIG. 2, an input signal to electrical-to-optical converter 204 through the capacitor C has a deviated direct-current component resulting in a deteriorated duty, as shown in FIG. 5B. As a measure therefor, bias adjustment circuit 205 is provided on the input side of electrical-to-optical converter 204, as shown in FIGS. 2C and 2D.

Accordingly, the duty of a waveform shown in FIG. 5B is improved by adjusting the bias voltage, as shown in FIG. 5C.

In the conventional transmission line, a wide range of transmission rate varying from low speed to high speed is used, and also both RZ code and NRZ code are used as transmission line code. Therefore, as mentioned above, it is necessary to prepare an optical wavelength converter corresponding to the transmission line code.

In an optical wavelength converter for connecting a system employing optical wavelengths of 1.3 $\mu$m band and a system employing optical wavelengths of 1.5 $\mu$m band, a conventional optical wavelength converter has the following problems to realize bit-free transmission using RZ or NRZ code, as having been explained in FIGS. 2 to 5.

First, each different optical wavelength converters are required corresponding to RZ or NRZ code. An electrical-to-optical converter and an optical-to-electrical converter employed in an optical wavelength converter have different interface levels of electric signals depending on manufactures.

For example, there are an optical-to-electrical converter having ECL (emitter coupled logic) level, and an electrical-to-optical converter having either ECL level or CML (current mode logic) level, and so forth. Also, there are different values of standard direct current (DC) potential such as −1.3 V in ECL level and −0.5 V in CML level.

Is such a case as having different standard DC potential, normally using capacitive coupling, an input bias voltage of an electrical-to-optical converter has to be changed corresponding to either RZ or NRZ code. This requires optical wavelength converters to be provided individually as shown in FIG. 2.

Secondly, there is a problem that input amplitude margin to the electrical-to-optical converter may be deteriorated. Generally, capacitive coupling is used in the optical-to-electrical converter as shown in FIG. 3. Capacitive coupling is also used in the electrical-to-optical converter.

For this reason, in case of RZ code, the duty shifts in the output waveform of the optical-to-electrical converter, as shown in FIG. 4. Furthermore, after the C coupling in the optical wavelength converter, the duty is shifted as shown in FIG. 5B. To cancel this, the duty is corrected in the electrical-to-optical converter by adjusting the bias voltage as shown in FIG. 5C. This produces decreased input amplitude, resulting in failing to satisfy the input condition against the specification of electrical-to-optical converter 204.

Thirdly, the shift in an optical input waveform produces deterioration in input amplitude margin of electrical-to-optical converter 204, and affects the duty of an optical output waveform.

The correction is carried out so that the duty ratio of an output waveform of electrical-to-optical converter 204 becomes 50% when the duty ratio of an input waveform of optical-to-electrical converter 203 is equal to 50%.

Therefore, when the duty of the input optical waveform is shifted, the duty of the output optical waveform is also shifted. However, because the input bias voltage of electrical-to-optical converter 204 is of fixed value, the shift in the input of electrical-to-optical converter 204 affects the output duty. Moreover, there may be a case that the input amplitude of electrical-to-optical converter 204 becomes small, resulting in failing to satisfy input specification condition.

SUMMARY OF THE INVENTION

It is therefore an object of the present invention to provide an optical wavelength converter whereby the above-mentioned problems can be solved.

The basic configuration of an optical wavelength converter according to the present invention is described hereafter. An optical wavelength converter for converting an optical signal in a first optical wavelength band into an optical signal in a second optical wavelength band includes: an optical-to-electrical converter for converting an input optical signal into an electric signal; an electrical-to-optical converter for converting an electric signal into an optical signal; and a duty control circuit connected between the optical-to-electrical converter and the electrical-to-optical converter for controlling the duty of the electric signal converted by the optical-to-electrical converter corresponding to either RZ code or NRZ code.

Preferably, the optical signal in the first optical wavelength band and the optical signal in the different second optical wavelength band respectively have wavelengths in 1.3 $\mu$m band and wavelengths in 1.5 $\mu$m band.

Preferably, the duty control circuit includes a mean value detection circuit for detecting respective mean values of non-inverted data of the electric signal and inverted data thereof; and a level converter controlled so that the mean values of the non-inverted data and the inverted data detected by the mean value detection circuit coincide with each other.

Furthermore, preferably, the level converter provides a differential pair circuit having both the non-inverted data and the inverted data of the electric signal as inputs thereof, to be connected to the electrical-to-optical converter either through an interface having resistors respectively inserted between both output drains (or collectors) of the differential pair and the ground, or through an interface having a common resistor inserted between both output drains (or collectors) and the ground.

Still further, preferably, a limiter circuit is provided for limiting a control signal level to control the level converter.

An optical wavelength division multiplexing system according to the present invention includes: multiplexing equipment for wave-multiplexing an optical signal in a second wavelength band converted from an optical signal in a first wavelength band by the aforementioned optical wavelength converter; an optical fiber for transmitting the optical signal wave-multiplexed by the multiplexing equipment; demultiplexing equipment for wave-demultiplexing the optical multi-wavelength signal transmitted through the optical fiber; and the aforementioned optical wavelength converter for converting each wavelength of optical signal having the second wavelength band demultiplexed by the demultiplexing equipment into optical signal having the first wavelength band.

Further scopes and features of the present invention will become more apparent by the following description of the embodiments with the accompanied drawings.

DETAILED DESCRIPTION OF THE PREFERRED EMBODIMENTS

The preferred embodiments of the present invention are described hereinafter referring to the charts and drawings.

In FIG. 6, there is shown a configuration block diagram of an optical wavelength converter in accordance with the present invention, enabling an optical bit-free transmission having NRZ code or RZ code.

Figure 6A:
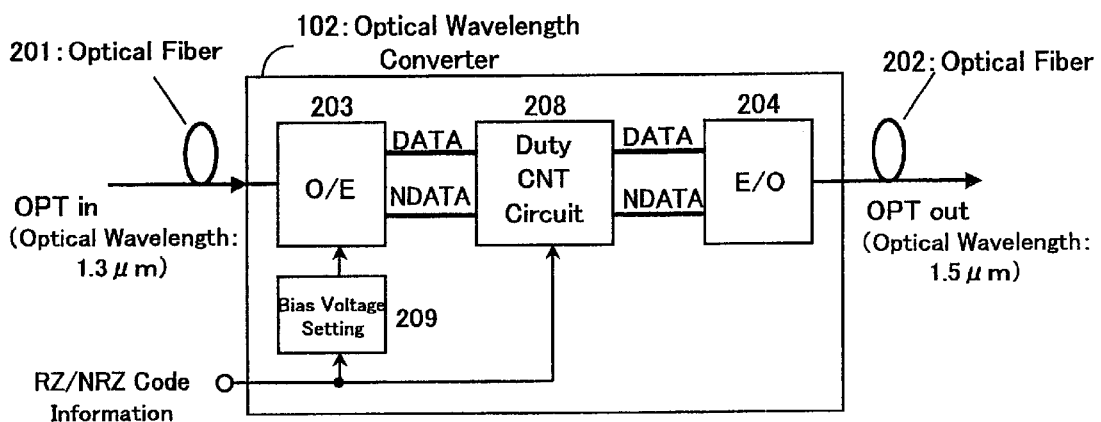
FIGS. 6A and 6B show examples of block diagram of an optical wavelength converter according to the present invention.

FIG. 6A shows an optical wavelength converter 102 to be used for connecting an optical communication system in which optical signals are transmitted through an optical fiber 201 using optical wavelengths of 1.3 μm band to another optical communication system in which optical signals are transmitted through an optical fiber 202 using optical wavelengths of 1.5 μm band.

Figure 6B:
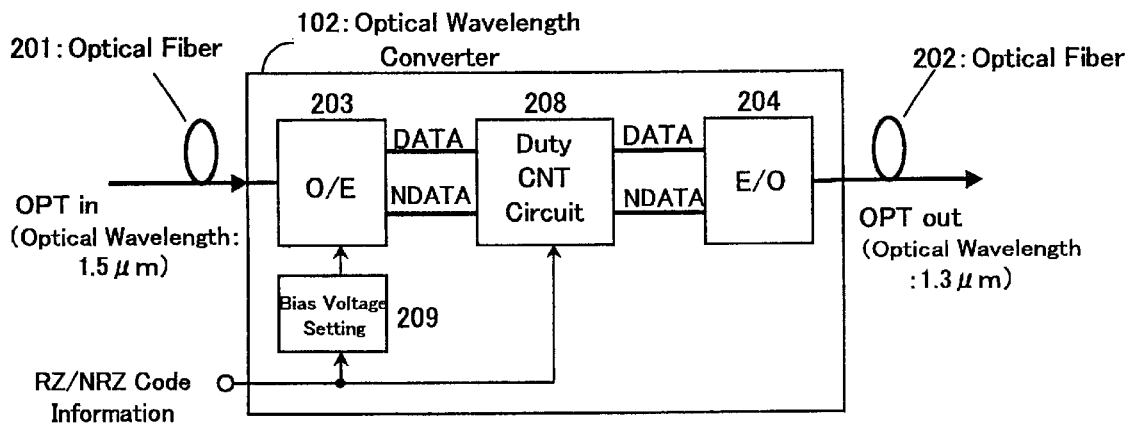

Also in FIG. 6B, there is shown optical wavelength converter 102 to be used for connecting the optical communication system in which optical signals are transmitted through optical fiber 202 using optical wavelengths of 1.5 μm band to the other optical communication system in which optical signals are transmitted through optical fiber 201 using optical wavelengths of 1.3 μm band.

In the configuration shown in FIGS. 6A and 6B, there is provided a duty control circuit 208 between optical-to-electrical converter 203 and electrical-to-optical converter 204, in place of a coupling capacitor C. In addition, a bias voltage setting circuit 209 is provided for setting a bias voltage in optical-to-electrical converter 203.

Above-mentioned bias voltage setting circuit 209 and duty control circuit 208 are respectively controlled depending on either RZ code or NRZ code.

Here, bias voltage setting circuit 209 is provided for avoiding an influence by the bias shift in optical-to-electrical converter 203. Duty control circuit 208 is provided for avoiding the duty deterioration in the input of electrical-to-optical converter 204 in case the duty ratio of optical input signal is 50%.

Figure 7:
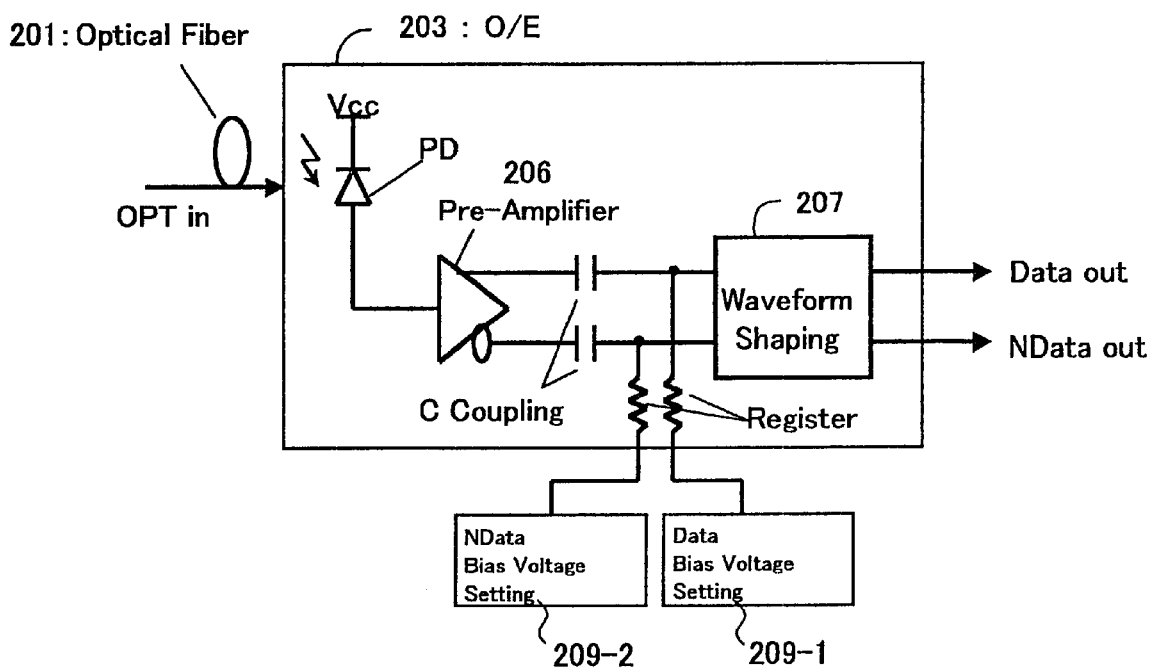
FIG. 7 shows a diagram illustrating the relation between optical-to-electrical converter 203 and bias voltage setting circuit 209.

In FIG. 7, there is a diagram showing the relation between optical-to-electrical converter 203 and bias voltage setting circuit 209 corresponding to FIG. 6. Bias voltage setting circuit 209 includes a first bias voltage setting circuit 209-1 for setting a bias voltage against a non-inverted signal DATA and a second bias voltage setting circuit 209-2 for setting a bias voltage against an inverted signal NDATA.

Thus, an output waveform of optical-to-electrical converter 203 can be controlled if input bias voltage of waveform shaping circuit 207 in optical-to-electrical converter 203 is changed according to RZ/NRZ code information.

Therefore, an output waveform of optical-to-electrical converter 203 is controlled by changing input bias voltage of waveform shaping circuit 207 in optical-to-electrical converter 203 according to RZ/NRZ code information.

For example, in case of RZ code, the bias voltage is adjusted so that the duty ratio of output waveform of optical-to-electrical converter 203 becomes 50% when the duty ratio of optical input waveform is 50%. Thus the duty ratio of optical output waveform remains 50% preventing duty deterioration.

Here, capacitive coupling is not applied between optical-to-electrical converter 203 and duty control circuit 208, and yet is not applied between duty control circuit 208 and electrical-to-optical converter 204, preventing the amplitude from being deteriorated.

In FIG. 8, there is shown a diagram illustrating an output waveform corresponding to RZ code input or NRZ code input in optical-to-electrical converter 203 shown in FIG. 7 which corresponds to the above description.

Referring to RZ code on the left column of FIG. 8, under a supposition that the optical input duty ratio is 50%, the bias voltage is shifted at the input of waveform shaping circuit 207 so that a mean value of the bias voltage reaches the center of amplitude.

Figure 8A:
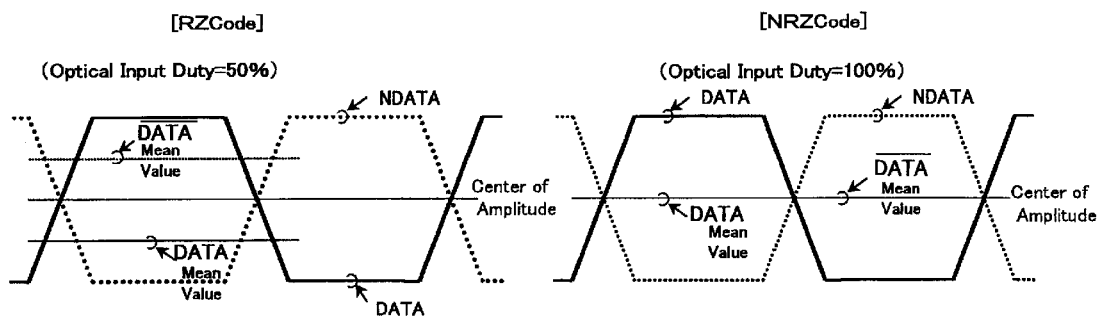
FIGS. 8A through 8D show output waveforms of optical-to-electrical converter 203, corresponding to RZ code input or NRZ code input.
Figure 8B:
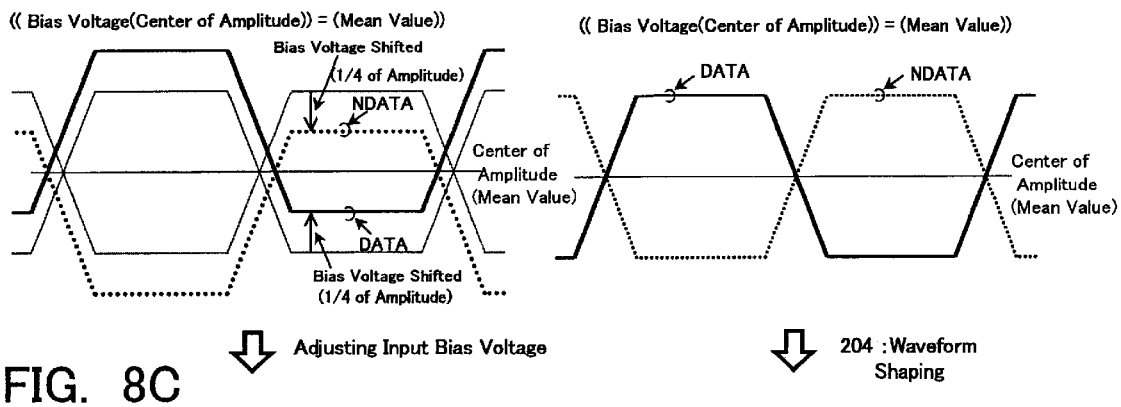

Therefore, when the bias voltage adjustment is not in operation, the bias voltage is shifted by one-fourth of the amplitude as shown in FIG. 8B.

Figure 8C:
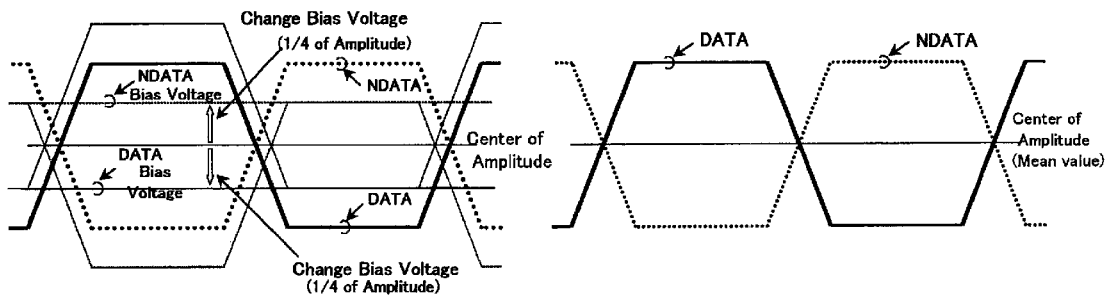
Figure 8D:
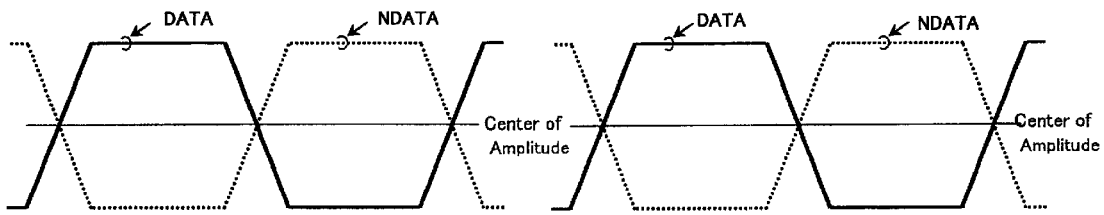

On the other hand, when bias voltage setting circuits 209-1 and 209-2 adjust bias voltage to the direction as shown by the arrows in FIG. 8C, the bias voltage of the inverted signal NDATA is shifted upward by one-fourth of the amplitude, and the bias voltage of the non-inverted signal DATA is shifted downward by one-fourth of the amplitude. Thus an output of waveform shaping circuit 207 i.e. an output of optical-to-electrical converter 203 maintains to have the duty ratio of 50%, as shown in FIG. 8D. Namely, the duty deterioration is not produced.

Figure 1:
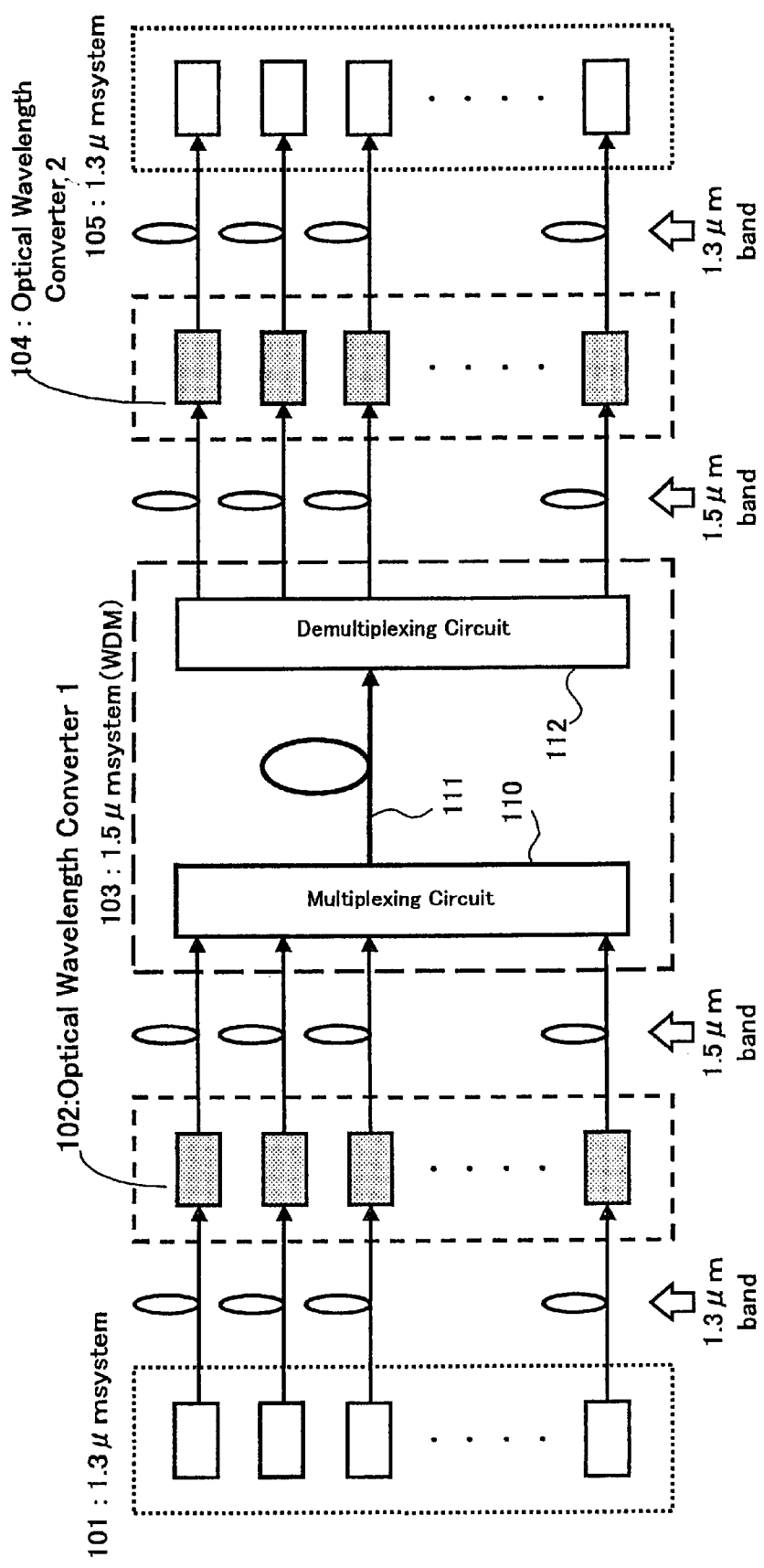
FIG. 1 shows a schematic diagram of a wavelength division multiplexing optical communication system.
Figure 2A:
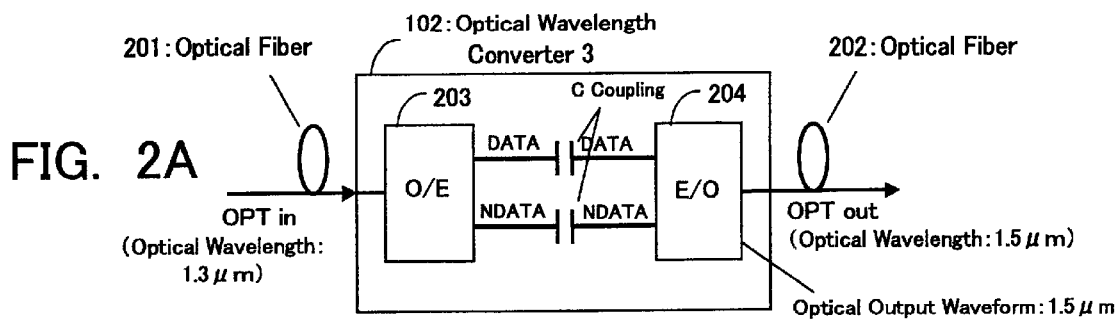
FIGS. 2A through 2D show block diagrams of conventional optical wavelength converters 102 and 104.
Figure 2B:
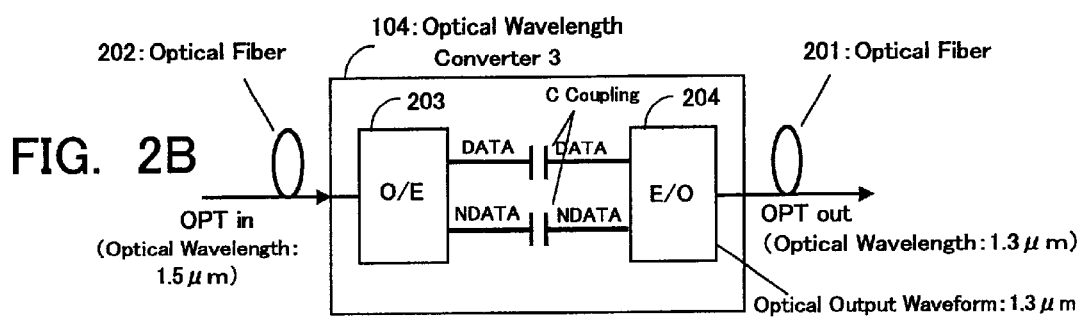
Figure 2C:
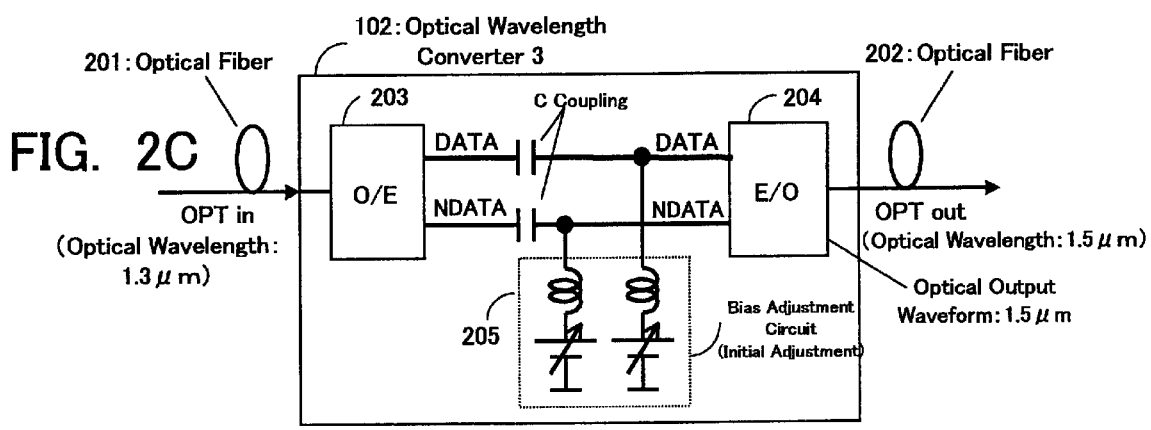
Figure 2D:
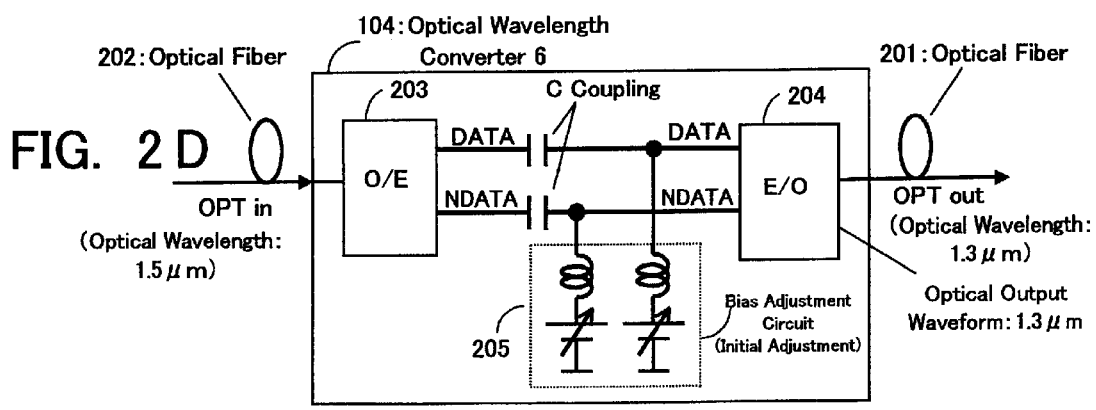
Figure 3:
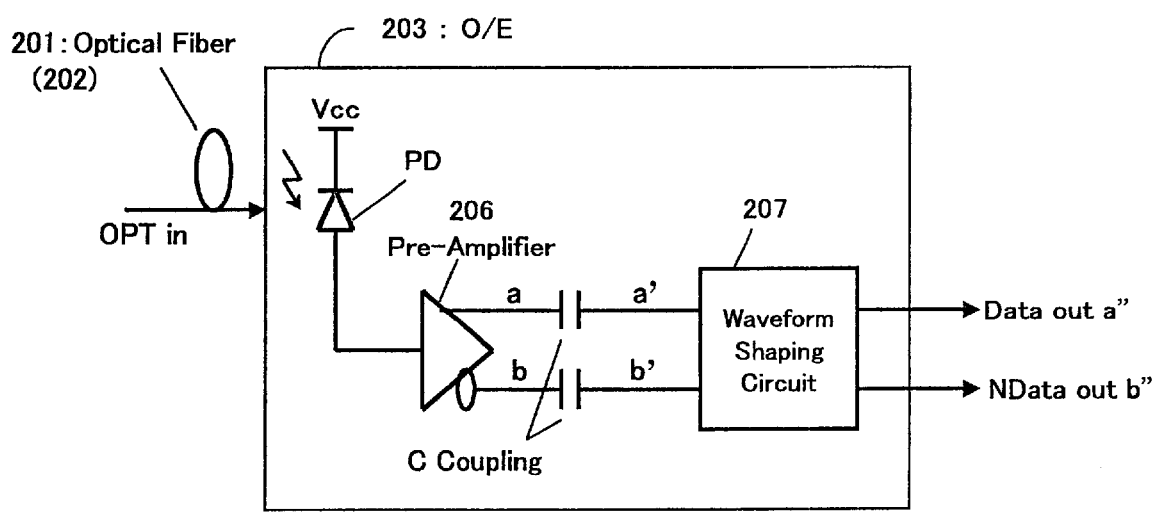
FIG. 3 shows a configuration example of an optical-to-electrical converter 203 in optical wavelength converters 102 and 104.
Figure 4A:
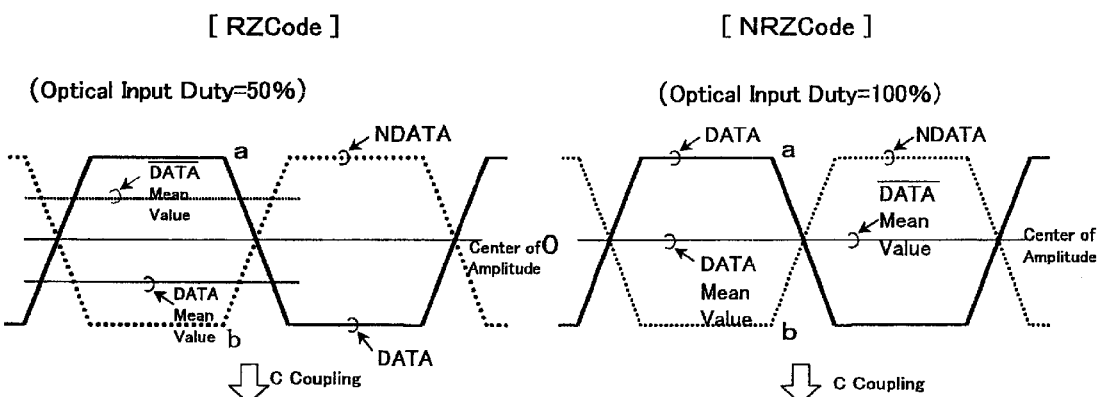
FIGS. 4A through 4C show waveforms in each part of optical-to-electrical converter 203 shown in FIG. 3, in the cases of RZ code and NRZ code.
Figure 4B:
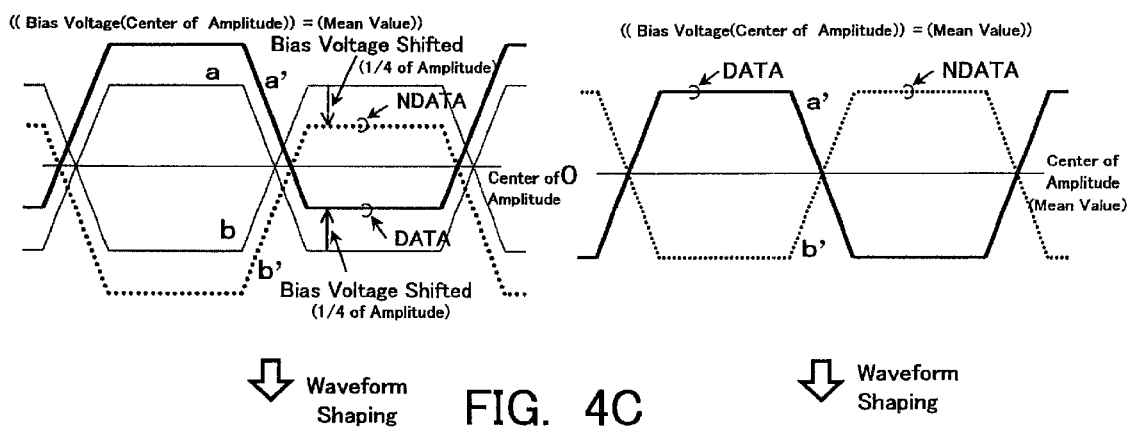
Figure 4C:
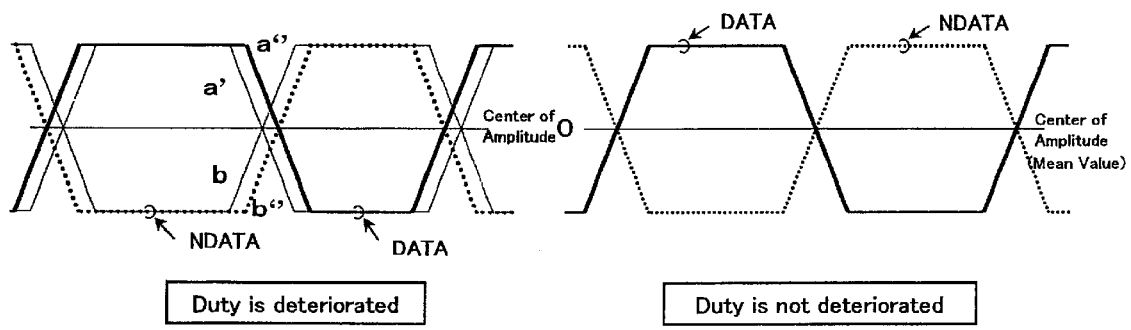
Figure 5A:
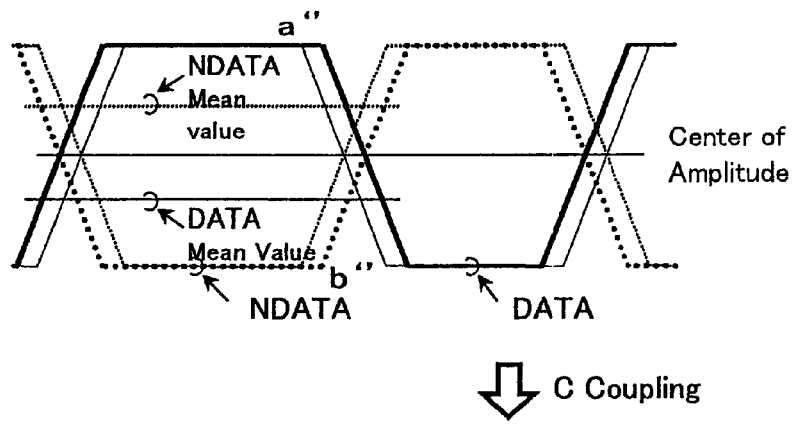
FIGS. 5A through 5C show diagrams for illustrating the reason for providing a bias adjustment circuit 205 to solve a problem of the deteriorated duty caused by the bias voltage shift in optical-to-electrical converter 203.
Figure 5B:
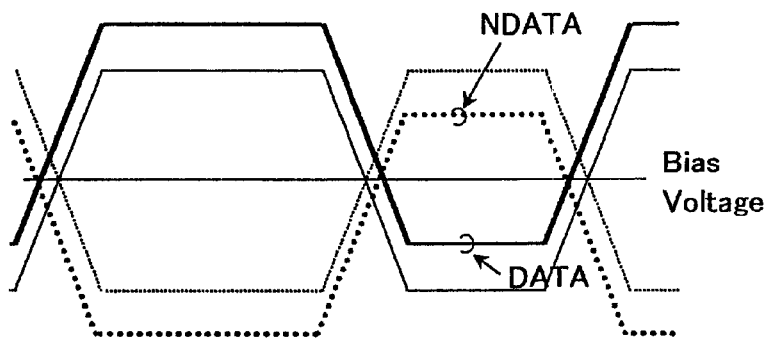
Figure 5C:
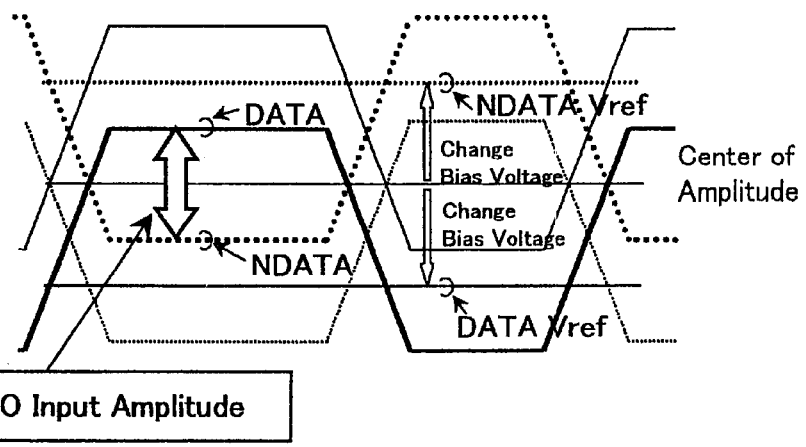

In the right column of FIG. 8, waveforms corresponding to NRZ code are shown. As previously explained in FIG. 4, no deterioration is produced even in the embodiment shown in FIG. 6.

Figure 9:
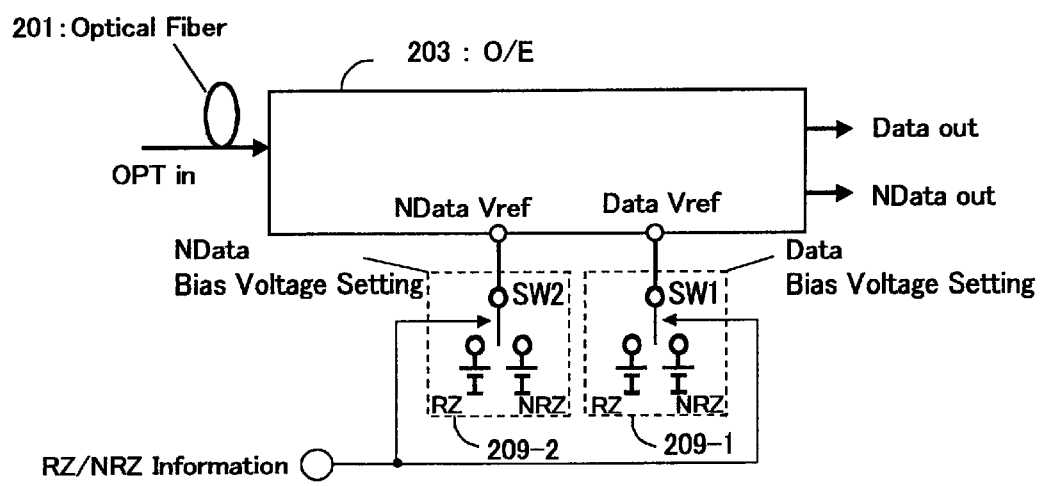
FIG. 9 shows a configuration example of bias voltage setting circuit 209.

In FIG. 9, a configuration example of bias voltage setting circuit 209 is shown. There are provided bias voltage setting switch 209-1 for non-inverted signal DATA, and bias voltage setting switch 209-2 for inverted signal NDATA.

There is provided fixed voltages each for RZ and NRZ code to be switched according to RZ/NRZ code information. Thus, an input bias voltage of waveform shaping circuit 207 in optical-to-electrical converter 203 is changed by the RZ/NRZ code information.

By changing this bias voltage in case of RZ code, it is possible to prevent deterioration of input amplitude of electrical-to-optical converter 204 caused by the duty change in an output of optical-to-electrical converter 203.

Figure 10:
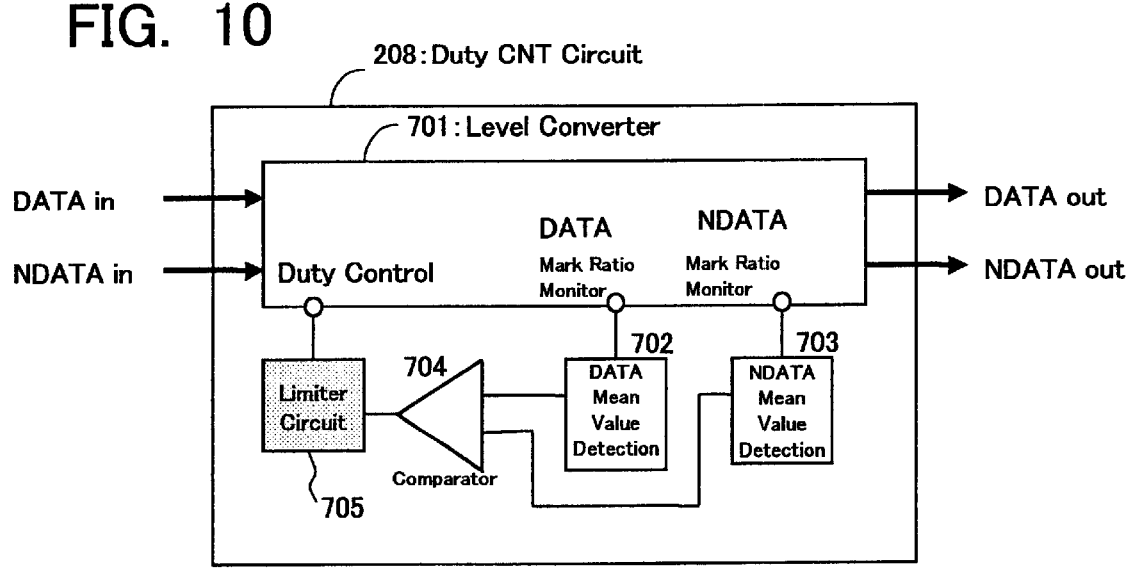
FIG. 10 shows a configuration block diagram of duty control circuit 208 shown in FIG. 6.

In FIG. 10, a configuration block diagram of duty control circuit 208 shown in FIG. 6. In FIG. 10, there is provided level converter 701 which inputs both non-inverted output DATA of optical-to-electrical converter 203 and inverted output NDATA thereof.

Moreover, there are provided a mean value detection circuit 702 for detecting mean value of non-inverted output DATA, and a mean value detection circuit 703 for detecting mean value of inverted NDATA, by monitoring a mark ratio of each non-inverted output DATA and inverted output NDATA. There is also provided a comparator 704 for outputting a duty control signal by comparing the aforementioned mean values.

Using the mark ratio monitoring function in level converter 701, respective mean values of non-inverted output DATA and inverted output NDATA are obtained by mean value detection circuits 702 and 703.

The duty is controlled so that these mean values satisfy the following formulas in respective RZ and NRZ code conditions.

In case of NRZ code;

(mean value of DATA)=(mean value of NDATA)

In case of RZ code;

(mean value of DATA)+((amplitude:Vpp)/4)=(mean value of NDATA)−((amplitude:Vpp)/4)

Thus the output duty is adjusted to the duty ratio=100% in case of NRZ, and the duty ratio=50% in case of RZ, respectively.

Accordingly, the duty deterioration in the optical output waveform compared to the duty in the optical input waveform can be prevented.

This duty control circuit 208 is bit independent, and therefore the rise/fall time (tr/tf) of the waveform is short, irrespective of the transmission rate.

This causes to produce an error when correcting the duty correction in low bit-rate transmission. For example, supposing possible duty range is ±50 ps, the amount of shift in the duty ratio is ±12.5% in case of high bit-rate transmission (2.4 Gb/s), while the amount of shift in the duty ratio is ±0.8% in case of low bit-rate (155 Mb/s) transmission.

Therefore, when a waveform having the duty of 110% is input to duty control circuit 208, it can be corrected in high bit-rate transmission. It is however difficult to correct in low bit-rate transmission, causing to produce an error.

In order to solve this problem, in the embodiment shown in FIG. 10, a limiter circuit 705 is additionally provided on the output side of comparator 704. Limiter circuit 705 limits the voltage of a duty control signal output from comparator 704, enabling to prevent from a runaway caused by an error. Thus bit free transmission can be realized.

Figure 11:
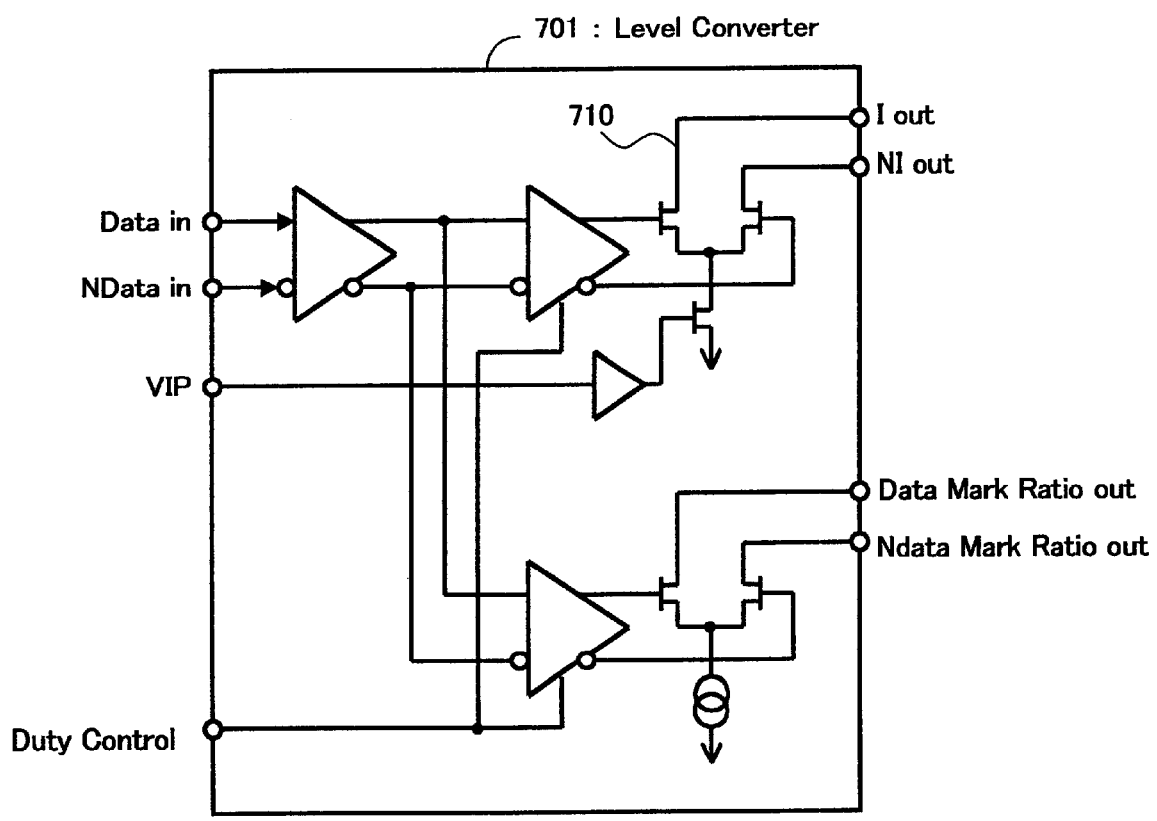
FIG. 11 shows a configuration example of level converter 701.

In FIG. 11, a configuration example of level converter 701 is shown. In drains or collectors of differential pair 710 in this example, the output of level converter 701 have open drain or open collector.

Figure 12A:
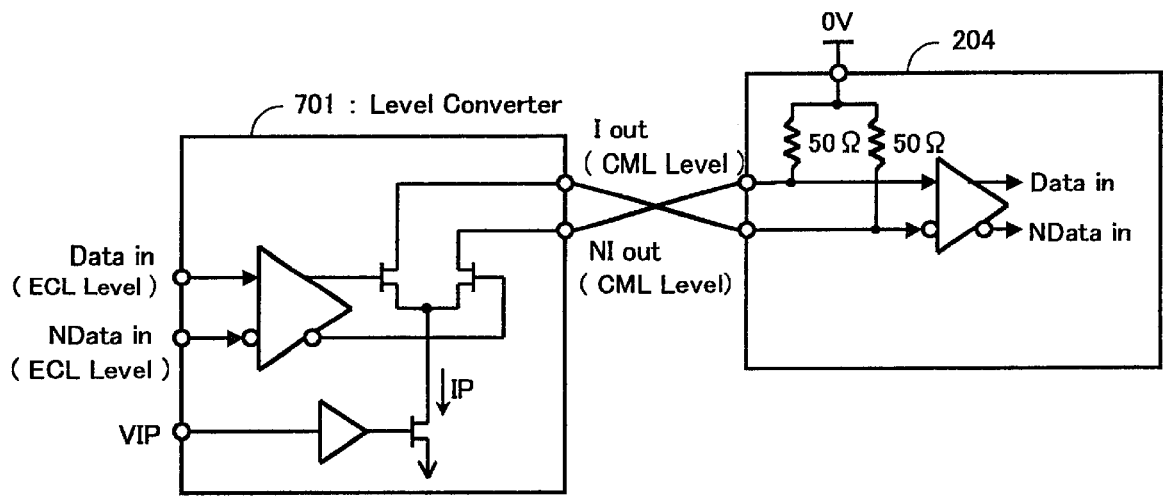
FIGS. 12A and 12B show diagrams illustrating a configuration which enables to cope with the interfaces of both ECL level and CML level.
Figure 12B:
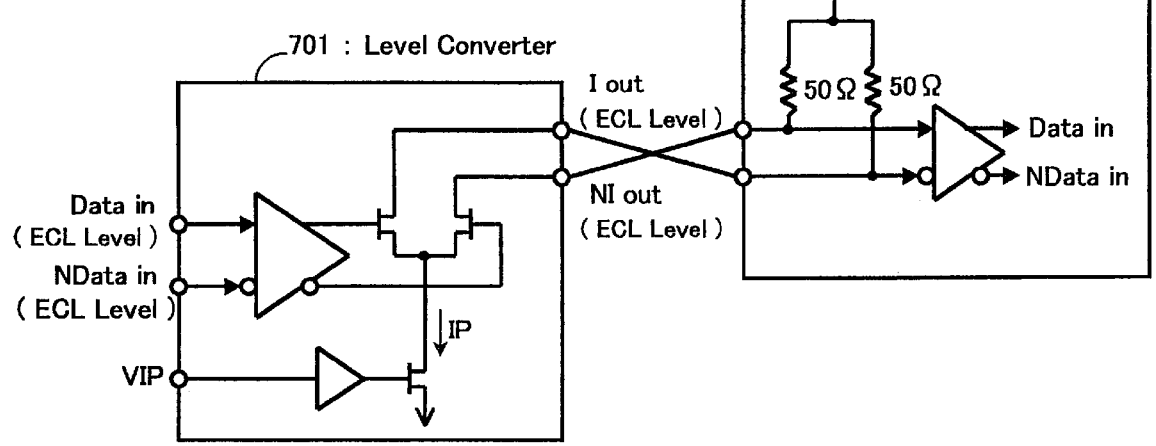

By connecting electrical-to-optical converter 204, it becomes possible to use for either interface having ECL level or CML level, as shown in FIG. 12 where a part of the circuit in FIG. 11 is not shown.

In the case, for example, ECL is employed in optical-to-electrical converter 203, that is, when input level to level converter 701 is ECL, the direct connection is possible when CML is employed (refer to FIG. 12A), or ECL is employed (FIG. 12B), in electrical-to-optical converter 204.

In the case electrical-to-optical converter is ECL (FIG. 12B), a register R1 is inserted between this converter and the power source in order for adjusting DC bias voltage. Here, a capacitor is provided in parallel with register R1 for setting the potential to zero volt in respect of alternating current.

Figure 13:
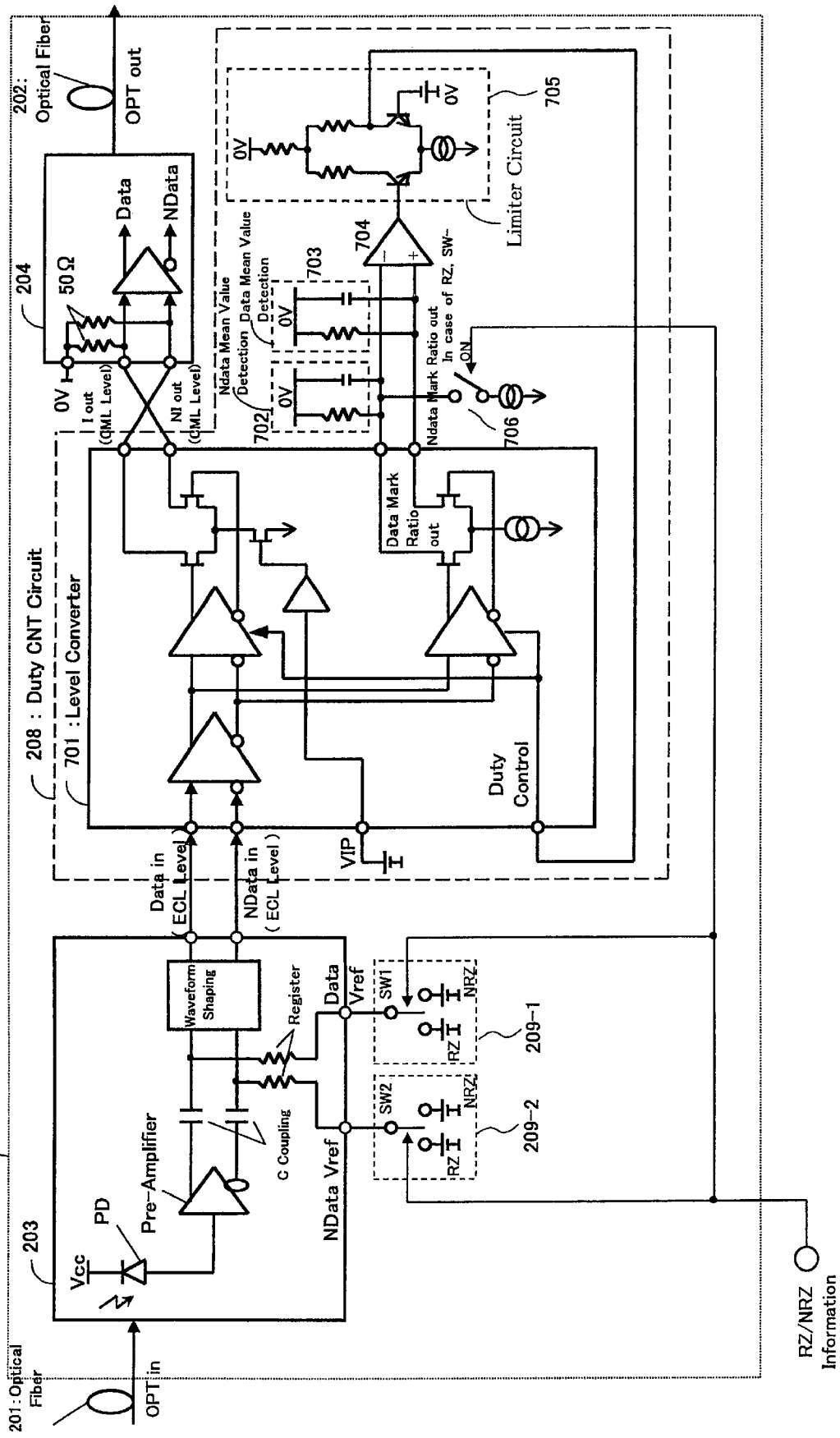
FIG. 13 shows an embodiment of optical wavelength converters 102 and 104 utilizing the features illustrated above.

In FIG. 13, there is shown an embodiment of optical wavelength converters 102 and 104 utilizing the features of the aforementioned embodiments. In this embodiment, the interface of electric signal is ECL level between optical-to-electrical converter 203 and duty control circuit 208, while the interface of electric signal is CML level between duty control circuit 208 and electrical-to-optical converter 204.

Optical wavelength converter 102 or 104 receives an optical signal having wavelengths of 1.3 $\mu$m band or 1.5 $\mu$m band input to optical-to-electrical converter 203 to convert into an electric signal. Then the duty of the converted electric signal is adjusted by level converter 701 in duty control circuit 208.

Then, the electric signal is converted into an optical signal by electrical-to-optical converter 204 to forward to optical fiber 202. In optical-to-electrical converter 203, bias voltage setting switches 209-1 and 209-2 automatically switch the bias voltage according to RZ/NRZ code information to prevent the duty deterioration in the output waveform.

In duty control circuit 208, mean values of non-inverted output DATA and inverted output NDATA are respectively detected by mean value detection circuits 702 and 703. The obtained mean values are compared with each other by comparator 704, to feedback to level converter 701 so that the mean values become equal. The duty control is carried out in such a manner.

In FIG. 13, a switch 706 is turned ON in case of RZ code to make the duty control effective. Namely, in case of RZ code, DC mean values of DATA and NDATA are different, and therefore adjustment is externally performed according to RZ/NRZ code information.

Also, corresponding to the embodiment shown in FIG. 10, an output of comparator 704 is led to level converter 701 through limiter circuit 705, to limit the range of duty control voltage so that error is not produced.

Figure 14:
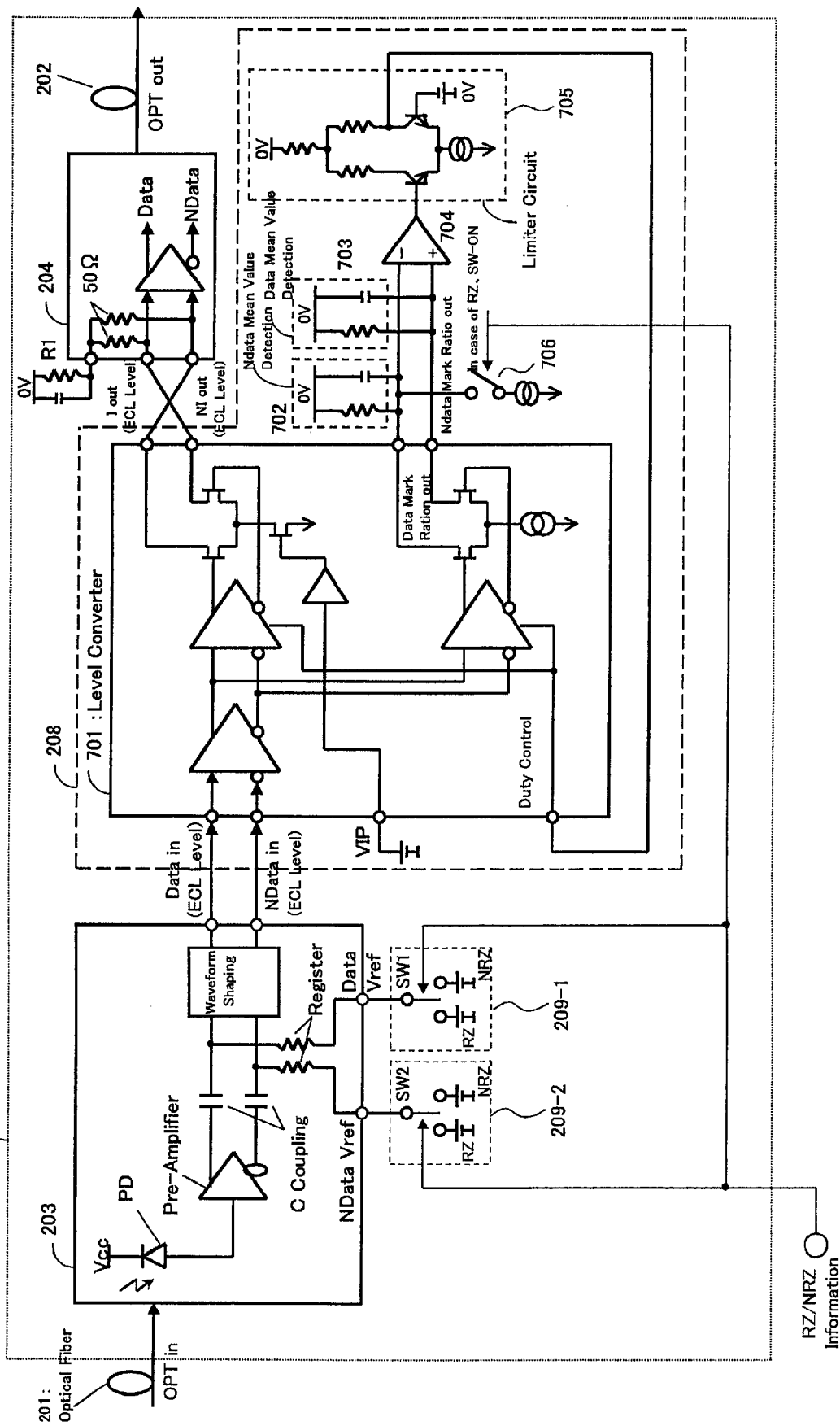
FIG. 14 shows a second embodiment of optical wavelength converters 102 and 104 utilizing the features illustrated above.

In FIG. 14, there is shown a second embodiment of optical wavelength converters 102 and 104 utilizing the features of the aforementioned embodiment. In this embodiment, ECL is employed for the electric signal interface between opticalto-electrical converter 203 and duty control circuit 208, as well as the interface between duty control circuit 208 and electrical-to-optical converter 204.

For this purpose, a parallel circuit consisting of a register R1 and a capacitor is provided in a bias circuit of electrical-to-optical converter 204. Other part of the configuration is the same as that shown in FIG. 13.

Having been illustrated in accordance with the charts and drawings, the present invention provides an automatic switch function of setting different bias voltage according to RZ/NRZ code information. Thus an optical wavelength converter having identical configuration can be used for both RZ code and NRZ code without producing the duty deterioration in the waveform.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical wavelength converter for converting an optical signal in a first optical wavelength band into an optical signal in a second optical wavelength band, comprising:
   an optical-to-electrical converter for converting an input optical signal into an electric signal;
   an electrical-to-optical converter for converting an electric signal into an optical signal; and
   a duty control circuit connected between said optical-to-electrical converter and said electrical-to-optical converter for controlling the duty of the electric signal converted by the optical-to-electrical converter according to RZ/NRZ code information.

2. An optical wavelength converter comprising:
   an optical-to-electrical converter for converting an optical signal into an electrical signal, having
      a first converter circuit for converting a first optical signal in a first optical wavelength into a first electrical signal,
      a waveform shaping circuit for limiting the first electric signal in amplitude to output an limited electrical signal,
      a series circuit including a coupling capacitor and a bias adjusting circuit provided after the coupling capacitor;
   an electrical-to-optical converter for converting the limited electrical signal into a second optical signal in a second optical wavelength; and
   a level converter provided between the optical-to-electrical converter and the electrical-to-optical converter for converting a level of the output of the electrical-to-optical converter to a signal having a level of the input of the electrical-to-optical converter.

3. The optical wavelength converter according to claim 1, wherein said duty control circuit includes:
   a mean value detection circuit for detecting mean values of non-inverted data and inverted data of the electric signal; and
   a level converter for controlling respective mean values of the non-inverted data and inverted data detected by the mean value detection circuit to become mutually equal in the case using NRZ code, and respective mean values of data obtained by adding one fourth value of an amplitude of the non-inverted data thereto and subtracting one fourth value of an amplitude of the inverted data therefrom in the case using RZ code.

4. The optical wavelength converter according to claim 3, wherein said level converter includes a differential pair circuit to which said electric signals having non-inverted data and inverted data are input,
   said differential pair circuit is connected to said electrical-to-optical converter either through an interface having resistors inserted between both output drains or collectors of said differential pair circuit and the ground, or through an interface having a common resistor inserted between both output drains or collectors of said differential pair circuit and the ground.

5. An optical wavelength division multiplexing system comprising:
   a first optical wavelength converter for converting an optical signal in a first optical wavelength band into an optical signal in a second optical wavelength band, including;
      an optical-to-electrical converter for converting an input optical signal into an electric signal;
      an electrical-to-optical converter for converting an electric signal into an optical signal; and
      a duty control circuit connected between said optical-to-electrical converter and said electrical-to-optical converter for controlling the duty of the electric signal converted by the optical-to-electrical converter according to RZ/NRZ code information;
   multiplexing equipment for wave-multiplexing the optical signal in the second wavelength band converted from an optical signal in a first wavelength band by the optical wavelength converter;
   an optical fiber for transmitting the optical multi-wavelength signal multiplexed by the multiplexing equipment;
   demultiplexing equipment for demultiplexing said optical multi-wavelength signal transmitted through the optical fiber; and
   a second optical wavelength converter for converting the wavelength of the optical signal having the second wavelength band demultiplexed from said demultiplexing equipment into the optical signal having said first wavelength band.

6. The optical wavelength division multiplexing system according to claim 5,
   wherein said second optical wavelength converter includes;
      an optical-to-electrical converter for converting an input optical signal into an electric signal;
      an electrical-to-optical converter for converting an electric signal into an optical signal; and
      a duty control circuit connected between said optical-to-electrical converter and said electrical-to-optical converter for controlling the duty of the electric signal converted by the optical-to-electrical converter according to RZ/NRZ code information.

* * * * *